United States Patent [19]
Lian et al.

[11] Patent Number: 5,563,765
[45] Date of Patent: Oct. 8, 1996

[54] AMORPHOUS COBALT ALLOY ELECTRODES FOR AQUEOUS ELECTROCHEMICAL DEVICES

[75] Inventors: Ke K. Lian, Northbrook; Lijun Bai, Vernon Hills, both of Ill.

[73] Assignee: Motorola, Inc., Schaumburg, Ill.

[21] Appl. No.: 297,074

[22] Filed: Aug. 29, 1994

[51] Int. Cl.$^6$ ........................................... H01G 9/00
[52] U.S. Cl. ..................... 361/503; 361/502; 361/508; 361/516; 361/528; 361/532; 429/221; 429/223; 429/220
[58] Field of Search ................... 361/502, 503, 361/504, 508, 511, 513, 528, 541, 535, 532, 526, 525, 517, 516; 429/220, 221, 223, 209, 224; 29/25.03

[56] References Cited

U.S. PATENT DOCUMENTS

| | | | |
|---|---|---|---|
| 4,960,651 | 10/1990 | Pettigrew et al. | 428/607 |
| 5,369,547 | 11/1994 | Evans | 361/516 |
| 5,932,191 | 2/1995 | Thomas et al. | 361/508 |

FOREIGN PATENT DOCUMENTS

| | | | |
|---|---|---|---|
| 0078404 | 9/1982 | European Pat. Off. | |
| 0083020 | 7/1981 | Japan | 361/532 |

*Primary Examiner*—Leo P. Picard
*Assistant Examiner*—Anthony Dinkins
*Attorney, Agent, or Firm*—Kenneth M. Massaroni

[57] ABSTRACT

A material for use as an electrode, and particularly the cathode (30) of an electrochemical device, such as a pseudocapacitive device (10). The material is a substantially amorphous material having a host matrix material selected from the group of cobalt, nickel, iron, and combinations, and a modifier element or elements selected from the group of boron, phosphorous, carbon, silicon, aluminum, manganese, copper, chromium, vanadium, titanium, molybdenum, zirconium, tungsten, and combinations thereof.

14 Claims, 7 Drawing Sheets

AMORPHOUS COBALT ALLOY ELECTRODES FOR AQUEOUS ELECTROCHEMICAL DEVICES

TECHNICAL FIELD

This invention relates in general to the field of electrochemical devices, and more particularly to materials which may be employed as electrodes therein.

BACKGROUND

Electrochemical capacitors are a class of high-rate energy storage/discharge devices which use electrolytes and electrodes of various kinds in a system similar to that of conventional batteries. Electrochemical capacitors, like batteries, are essentially energy storage devices. However, unlike batteries, they rely on charge accumulation at the electrode/electrolyte interface to store energy. Charge storage in electrochemical capacitors therefore is a surface phenomenon. Conversely, charge storage in batteries is a bulk phenomenon occurring within the bulk of the electrode material.

Electrochemical capacitors can generally be divided into two subcategories: Double layer capacitors in which the interfacial capacitance at the electrode/electrolyte interface can be modeled as two parallel sheets of charge; and pseudocapacitor devices in which charge transfer between the electrolyte and the electrode occurs over a wide potential range. These charge transfers are the result of primary, secondary, and tertiary oxidation/reduction reactions between the electrode and the electrolyte. These types of electrochemical capacitors are being developed for high-pulse power applications.

Most of the known pseudocapacitor active materials are based on noble metal elements such as ruthenium and iridium. These materials are generally quite expensive. Material expense thus poses a significant hurdle to the wide-spread commercialization of this technology. Other less expensive materials have been tried, but have been less than successful. For example, workers in the field have attempted to fabricated devices using pressed powder cobalt and cobalt oxide electrodes. However, these types of electrodes have failed for numerous reasons including, for example, poor life cycle performance, and inability to achieve desired electrochemical performance characteristics.

Accordingly, there exists a need for pseudocapacitive electrode materials which deliver good performance in terms of energy storage, power density, and cycle life. Moreover, such materials should be abundant in nature, inexpensive in cost, readily processable into devices, and relatively benign environmentally.

DETAILED DESCRIPTION OF THE PREFERRED EMBODIMENTS

Figure 1:
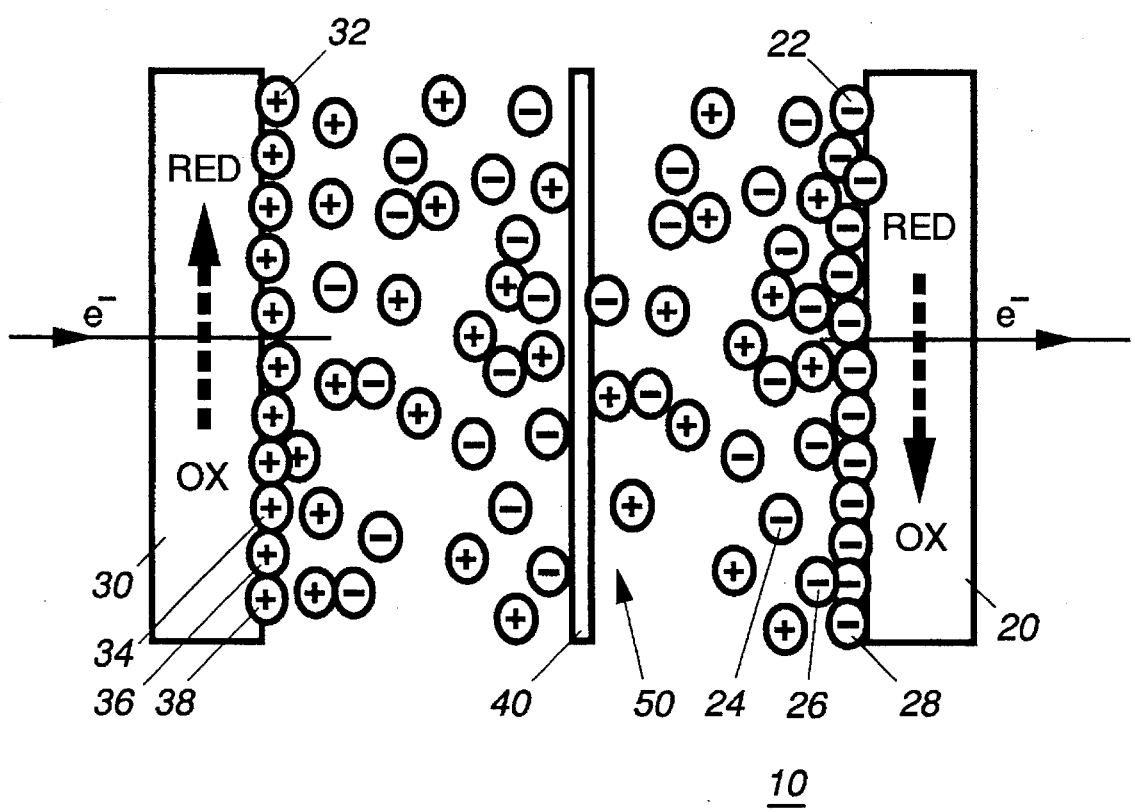
FIG. 1 is a schematic representation of a high-energy density pseudocapacitor in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of a high energy density electrochemical capacitor device (10) in accordance with the instant invention. The device (10) includes an anode (20), a cathode (30) and a separator (40) operatively disposed between the anode and the cathode. Also disposed between the anode (20) and the cathode (30) is an electrolyte (50), which as illustrated in FIG. I is an aqueous (liquid) electrolyte disposed entirely about both the anode (20) and the cathode (30).

In one preferred embodiment of the invention, the cathode (30) is fabricated of an amorphous cobalt alloy material such as that described hereinbelow. The anode material may be fabricated from any of a number of different materials known in the art. Examples of such materials include vanadium oxides, chromium oxides, manganese oxides, iron oxides, cobalt oxides, nickel oxides or their corresponding sulfides, selenides, tellurides, and combinations thereof.

The electrolyte used in connection with the electrochemical capacitor device in accordance with the invention may be any aqueous electrolyte, such as an alkaline electrolyte, neutral electrolyte, acid electrolyte, and combinations thereof. In one preferred embodiment, the electrolyte is 31% KOH. Similarly the separator (40) may be fabricated of a number of known separator materials as are practiced in the art. Specific examples of such separators includes but are not limited to porous cellulose, porous silica, glass wool, glass fiber, polypropylene, and combinations thereof.

The schematic representation of the capacitor device as shown in FIG. 1 is used to explain the redox processes occurring at the anode and the cathode. During charging, electrons, for example, (22, 24, 26, 28), flow to the anode (20) as shown, and the active material from which the anode is formed undergoes a reduction process. The resulting charge imbalance, here, an excess of negative charge, is balanced by the migration of positively charged ions (32, 34, 36, 38) from the electrolyte to cathode (30) as shown.

While the reduction process occurs at the anode, a complimentary oxidation process takes place at the cathode, resulting in the ejection of an electron. Both the electrode processes occur at or near the electrode/electrolyte interface.

During this process, ions pass through the porous separator (40). The entire scenario is then reversed during the discharge process of the pseudocapadtor electrodes.

In accordance with the present invention, there is provided an electrode material for use as, for example, the cathode in an aqueous electrochemical capacitor. The electrode material comprises a disordered, single-phase, multicomponent material having a host matrix material and at least one modifier element. The host matrix material may be selected from the group of materials consisting of cobalt (Co), nickel (Ni), iron (Fe), and combinations thereof. Similarly, the modifier element may be selected from the group of silicon (Si), boron (B), phosphorus (P) carbon (C), aluminum (Al), manganese (Mn), copper (Cu), chromium (Cr), vanadium (V), titanium (Ti), molybdenum (Mo), zirconium (Zr), Tungsten (W), and combinations thereof. Indeed, it is contemplated that more than one modifying element will routinely be added to the host matrix material.

It is contemplated that the multicomponent material, will be amorphous; alternatively, the material may be either microcrystalline or polycrystalline, so long as it is lacking in long range compositional order. The material may also include crystalline inclusions. The substantially amorphous materials of the instant invention lack long range structural order, but possess short-range structural and chemical order. As a result, these materials have a higher concentration of coordinatively unsaturated sites (CUS). These CUS are very active sites for surface reaction and surface catalytic/electrocatalytic reactions. It is a fundamental characteristic of electrochemical capacitors such as pseudocapacitors that the electrochemical reactions be substantially surface phenomenon. Accordingly, higher concentrations of active surface sites, such as the CUS, will yield better electrochemical activity.

Exemplary materials according to the instant invention include but are not limited to:

$Co_{66}Fe_4Ni_1Si_{15}B_{14}$, $Co_{69}Fe_4Ni_1Mo_2Si_{12}B_{12}$, $Co_{63}Cr_{27}Ni_{13}Fe_3W_4$ and $Co_{72}Ni_{18}P_{10}$. The materials are expressed in atomic percent.

EXAMPLES

The invention is further discussed by offering specific examples of the electrode material.

PREPARATION OF THE AMORPHOUS COBALT MATERIAL

Materials having the compositions described herein were mixed and pre-melted to form an ingot. Thereafter, the materials were subjected to a re-melted and melt-spinning process in which a stream of liquid metal is ejected from a nozzle in the crucible in which the ingot was re-melted. The nozzle has a thin slit which directs the molten metal onto a cold rotating metal wheel. As the metal flows from the slit, it is rapidly quenched at a rate of approximately $10^{6\circ}$ C./second. As a result of rapid quenching, the material forms an amorphous alloy ribbon. Melt spinning techniques such as described herein are well-known in the art.

Amorphous cobalt alloy materials as described herein may then be pretreated by for example: a) immersing in alkaline solution for a long period of time (e.g. 24 hr) to form a mixed oxide/hydroxide film; b) etching in acids to increase surface area; and c) anodizing in alkaline solutions. In the present case, the material were immersed in 31% KOH for approximately 24 hours, and anodized at a range of between −0.8 and −0.5 V versus Hg/HgO for between 10 and 30 seconds prior to electrochemical testing. The anodization process leads to the formation of cobalt and iron (in iron containing alloys) oxides and hydroxides.

Testing of alloys prepared as described above was carded out in a standard 3-compartment electrochemical cell containing 31% KOH solution, a large area nickel gauze counter electrode, and a Hg/HgO reference electrode. Electrochemical experiments were carried out on an EG&G M273 potentiostat.

EXAMPLE I

A first amorphous cobalt alloy having the composition $Co_{69}Fe_4Ni_1Mo_2Si_{15}B_{12}$ was tested to determine its electrochemical properties. The material is commercially available as a soft magnetic material, and is known as Metglas 2705M. A first sample of the material had the following dimensions: thickness of 50 μm, weight of 0.0107 g, and area of approximately 0.92 cm².

Figure 2:
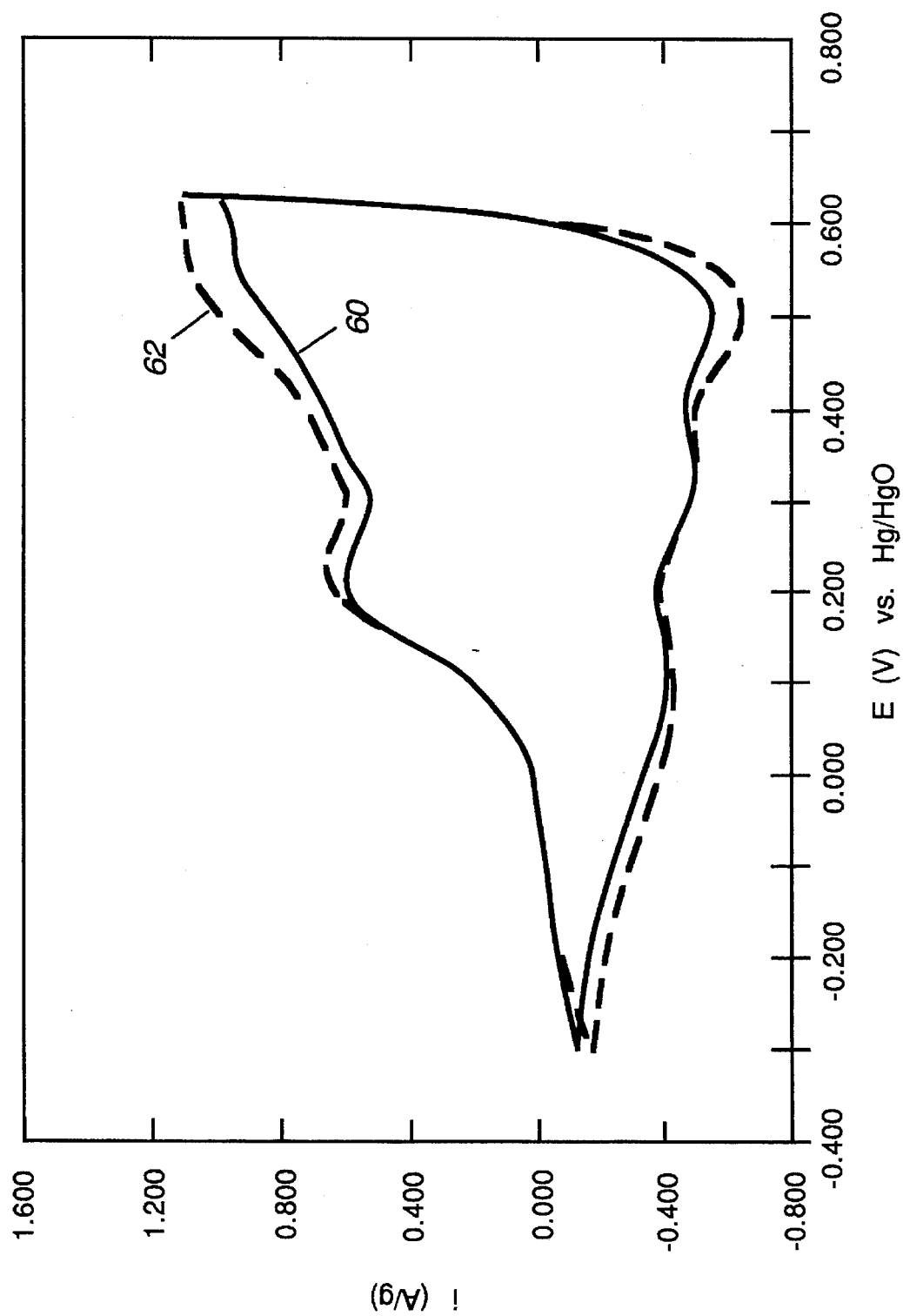
FIG. 2 illustrates the cyclic voltammagrams of an amorphous cobalt alloy electrode tested in 31% KOH electrolyte at a 200 mV/s sweep rate, in accordance with the instant invention.

Referring now to FIG. 2, there is illustrated therein a cyclic voltammagram (CV) of the sample of material described above. The CV illustrated by line 60 was taken after 4000 cycles of the material, and demonstrates a symmetrical profile at a sweep rate of 200 mV/s. The symmetrical peaks seen in the CV suggests a multi-electron transfer oxidation/reduction reaction over a certain potential range. These electron transfer electrochemical reactions are kinetically fast and reversible, which is a characteristic of pseudocapacitive behavior. CV testing was repeated after 12,000 cycles, and is illustrated by line 62. The results indicated stable, reproducible, pseudocapacitive behavior.

Figure 3:
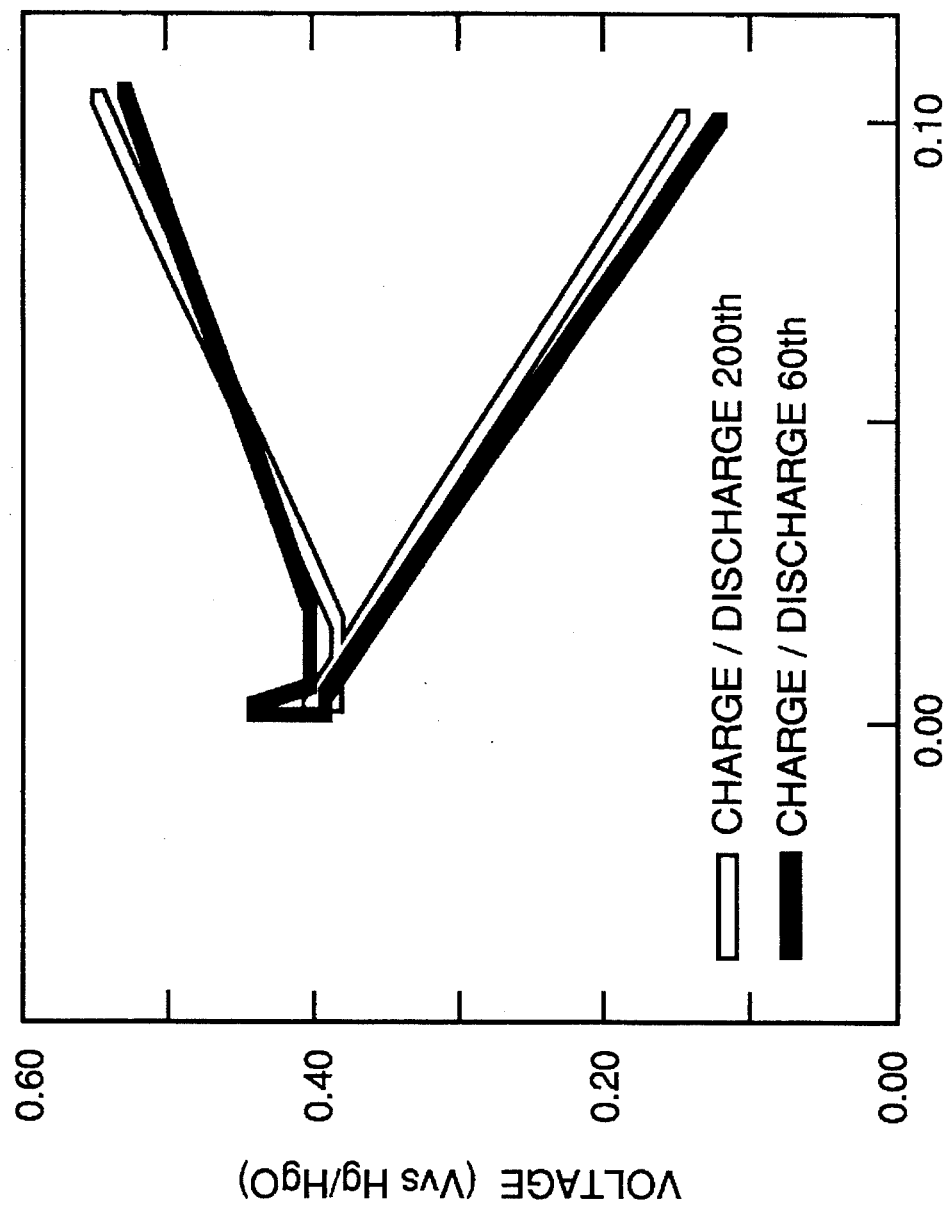
FIG. 3 is a series of constant current charging/discharging curves for an amorphous cobalt alloy electrode fabricated in accordance with the instant invention.

Referring now to FIG. 3, there is illustrated therein the constant current charge/discharge curves for the instant material. In contrast to battery materials which show a relatively flat potential vs. time relationship, the curves in FIG. 3 show a linear potential decline which is a typical capacitive transient. The symmetrical charging/discharging transient is indicative of a material that may be readily charged and discharged at a rapid rate. FIG. 3 also demonstrates that the electrochemical behavior of the material is stable as the transient after 200 cycles was faster and more symmetrical than that after 60 cycles.

Figure 4:
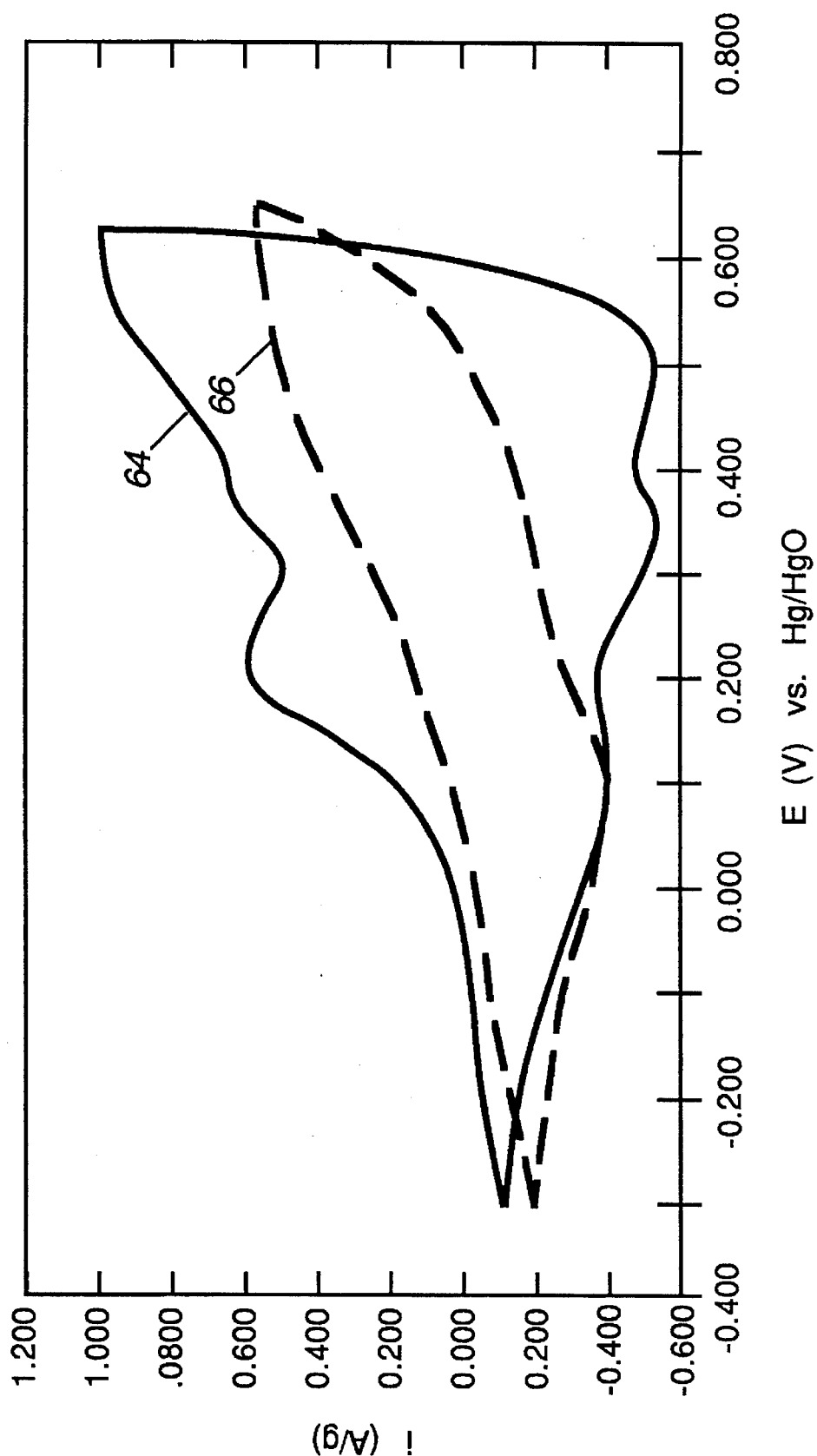
FIG. 4 illustrates the cyclic voltammagrams of a cobalt alloy in 31% KOH electrolyte at a 200 mV/s sweep rate, after 1000 cycles, before and after annealing, in accordance with the instant invention.

In order to determine whether or not the amorphous structure of the cobalt alloys material contributed to the pseudocapacitive performance, the material of this example was partially re-crystallized by annealing. After annealing at 550° C. for 1 hour, the sample became very brittle indicating the formation of a multiphase crystalline material. Referring now to FIG.4, there are two CV curves, from before (64) and after (66) annealing, respectively. The electrode was tested via the same procedure as the amorphous alloy. The results showed that the CV was asymmetrical, with poor chargeability. The results in FIG. 4 strongly suggest that the superior electrochemical activity illustrated in FIGS. 2 and 3 are attributable to the amorphous structure of the alloys.

EXAMPLE II

A second amorphous cobalt alloy having the composition $Co_{66}Fe_4Ni_1Si_{15}B_{14}$ was tested to determine its electrochemical properties. The material is also commercially available as a soft magnetic material and is known as Metglas 2714A. A first sample of the material had the following dimensions: thickness of 40 μm, weight of 0.0097 g, and area of approximately 0.90 cm².

Figure 5:
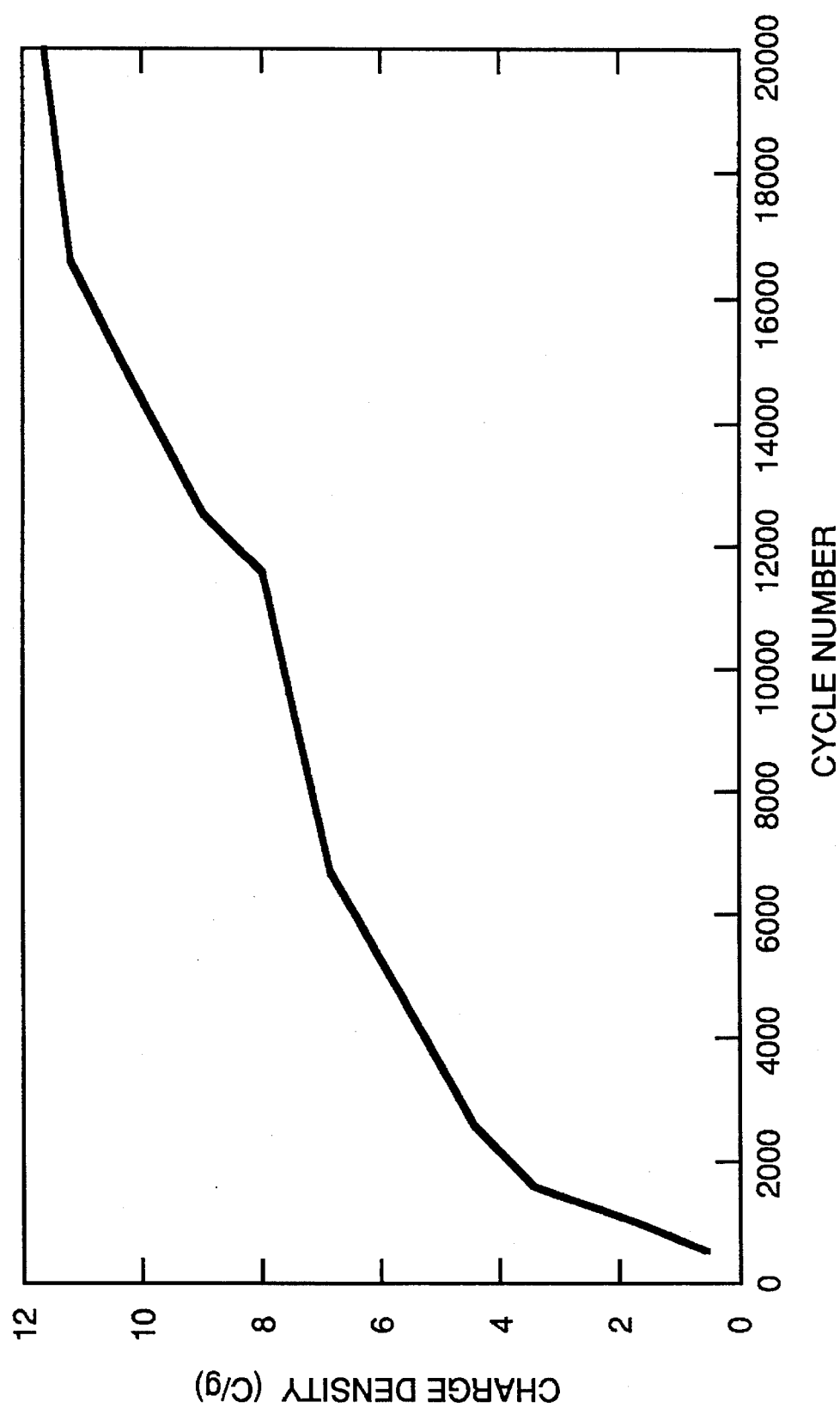
FIG. 5 is a chart comparing charge density versus cycle number for an amorphous cobalt alloy electrode in accordance with the instant invention.
Figure 6:
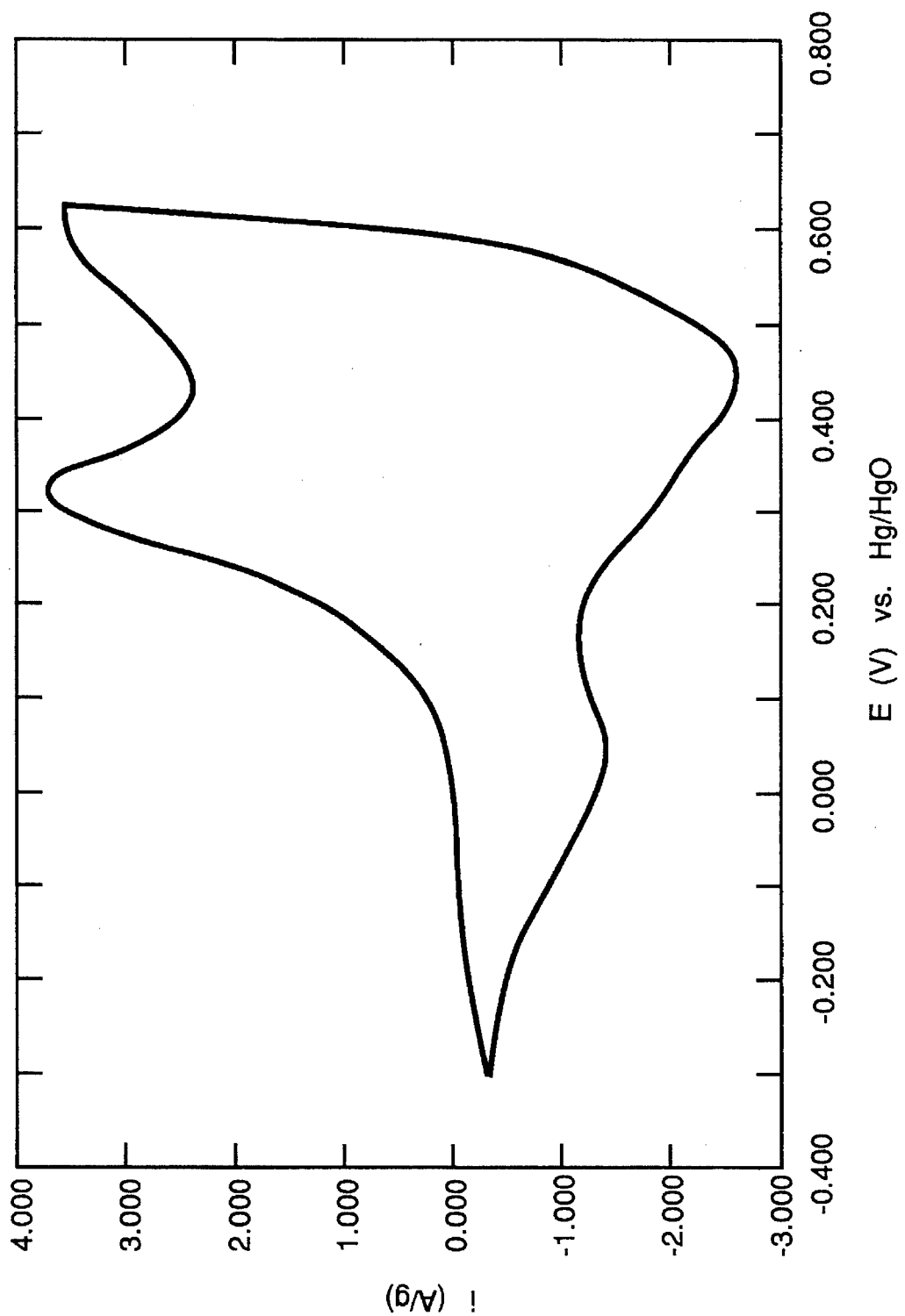
FIG. 6 is a cyclic voltammagram of an amorphous cobalt alloy electrode tested after 20,000 cycles, in 31% KOH electrolyte at a 100 mV/s sweep rate, in accordance with the instant invention.

Referring now to FIG. 5, there is illustrated therein a chart comparing charge density versus cycle number for an amorphous cobalt alloy electrode material as described above. Specifically, the material was scanned over 20,000 CV cycles, and measured for charge density. As may be appreciated from FIG. 5, the charge density increased consistently with cycle number, until the test terminated at 20,000 cycles. This increase in charge density was believed to be attributable to the formation and development of a hydrated mixed metal oxide film which is electronically/ionically conductive and can facilitate multi-electron transfer oxidation/reduction faradaic reactions. The CV's which were run to compile information for FIG. 5 also indicated that the material demonstrates a symmetric profile indicative of pseudocapacitive behavior. This is illustrated in FIG. 6, which is the CV of the material after 20,000 cycles, at a sweep rate of 100 mV/s.

Figure 7:
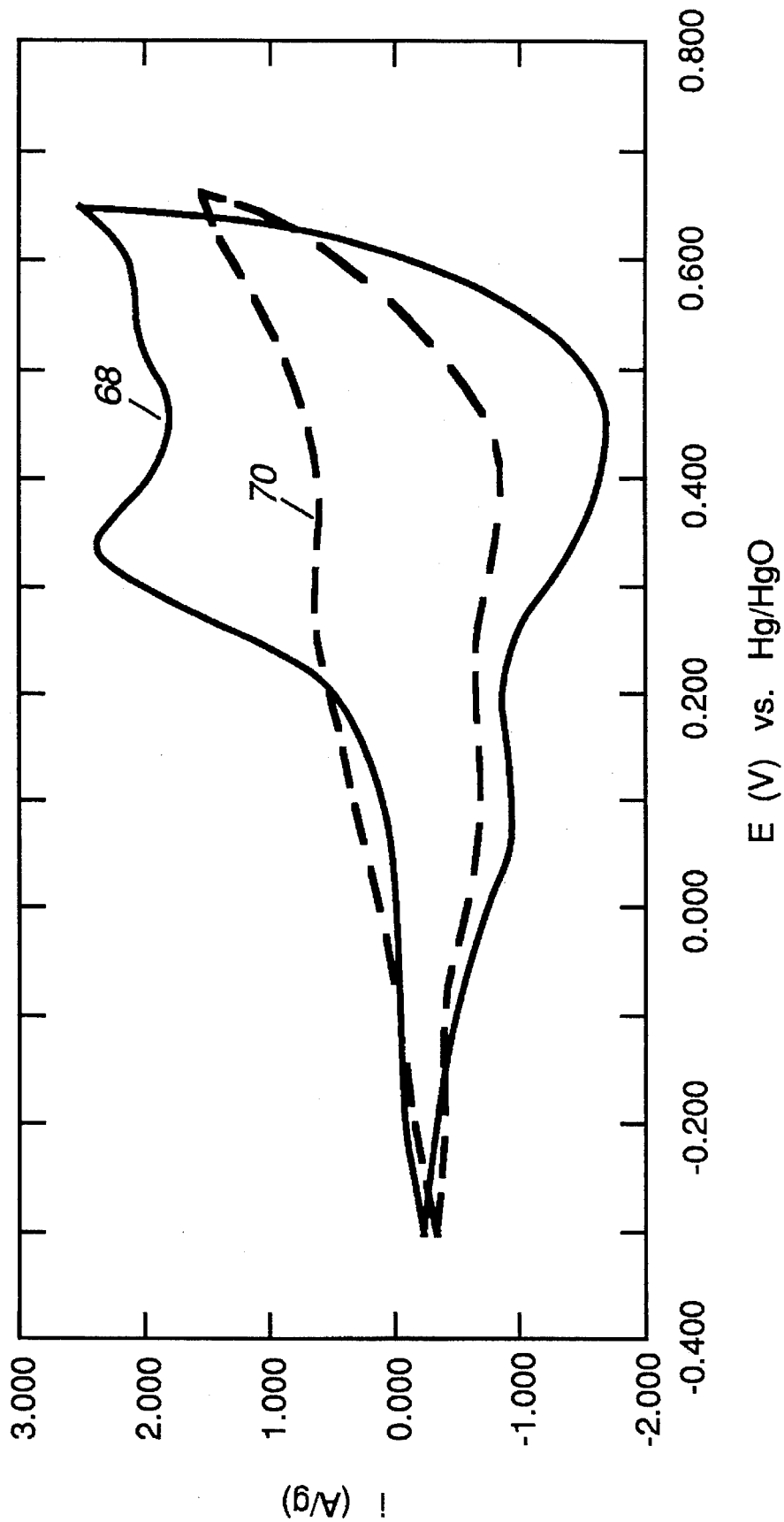
FIG. 7 illustrates the cyclic voltammagrams of another cobalt alloy in 31% KOH electrolyte at a 200 mV/s sweep rate, after 1000 cycles, before and after annealing, in accordance with the instant invention.

To test the importance of the crystallographic structure on electrochemical performance, a sample of material was again recrystallized by annealing. After annealing at 550° C. for 1 hour, the sample became very brittle indicating the formation of a multiphase crystalline material. Referring now to FIG.7, there are two CV curves, from before (68) and after (70) annealing, respectively. The electrode was tested in the same procedure as that on its amorphous counterpart. The results showed that the current density of crystalline alloy was much less than that of its amorphous counterpart, indicating a relatively poor activity in the crystalline alloy.

COMPARATIVE RESULTS

Amorphous cobalt alloy materials as described herein afford significant performance and price advantages over the materials commonly used in the prior art. These advantages are illustrated in the following table, in which measurements are based on flat, planar electrodes.

| MATERIAL | CHARGE DENSITY | | CAPACITANCE |
|---|---|---|---|
| | mC/g | mC/cm$^2$ | F/cm$^2$ |
| MG2714A | 13,000 | 100 | 0.2 |
| MG2705MN | 6,700 | 70 | 0.06 |
| Iridium | 200 | 12 | 0.04 |
| Ruthenium | 2,400 | 60 | 0.06 |

In terms of cost, amorphous cobalt alloys are commercially available at typical costs of approximately $250/kg, versus approximately $9,500/kg for ruthenium, and $64,500/kg for iridium. It may thus be appreciated that the instant amorphous cobalt alloys enjoy a substantial cost and performance advantage over the materials of the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrode for an electrochemical device comprising a disordered multicomponent, single phase material, said material including a host matrix material selected from the group consisting of cobalt, nickel, iron, and combinations thereof, and at least one modifier element selected from the group consisting of boron, phosphorus, silicon, carbon, aluminum, manganese, copper, chromium, vanadium, titanium, molybdenum, zirconium, tungsten, and combinations thereof.

2. An electrode as in claim 1, wherein said electrochemical device is an aqueous pseudocapacitive device.

3. An electrode as in claim 1, wherein said electrode is the cathode of said device.

4. An electrode as in claim 1, wherein said material is substantially amorphous.

5. An electrode as in claim 1, wherein said material is $Co_{69}Fe_4Ni_1Mo_2Si_{12}B_{12}$.

6. An electrode as in claim 1, wherein said material is $Co_{66}Fe_4Ni_1Si_{15}B_{14}$.

7. An electrodes as in claim 1, wherein said material is $Co_{63}Cr_{27}Ni_3Fe_3W_4$.

8. An electrode as in claim 1, wherein said material is $Co_{72}Ni_{18}P_{10}$.

9. An aqueous pseudocapacitive device comprising:
a cathode comprising a disordered multicomponent, single phase material, said material including a host matrix material selected from the group consisting of cobalt, nickel, iron, and combinations thereof, and at least one modifier element selected from the group consisting of boron, phosphorus, carbon, silicon, aluminum, manganese, copper, chromium, vanadium, titanium, molybdenum, zirconium, tungsten, and combinations thereof;
an anode formed of a material which is electrochemically compatible with said cathode;
a separator operatively disposed between said anode and said cathode; and
a liquid electrolyte in contact with said cathode and said anode.

10. A pseudocapacitive device as in claim 9, wherein said cathode material is substantially amorphous.

11. A pseudocapacitive device as in claim 9, wherein said cathode material is $Co_{69}Fe_4Ni_1Mo_2Si_{12}B_{12}$.

12. A pseudocapacitive device as in claim 9, wherein said cathode material is $Co_{66}Fe_4Ni_1Si_{15}B_{14}$.

13. A pseudocapacitive device as is claim 9, wherein said cathode material is $Co_{63}Cr_{27}Ni_3Fe_3W_4$.

14. A pseudocapacitive device as is claim 9, wherein said cathode material is $Co_{72}Ni_{18}P_{10}$.

* * * * *